June 24, 1947.   G. M. GIANNINI   2,422,960
ELIMINATION OF VIBRATION ERRORS IN MAGNETIC COMPASSES AND THE LIKE
Filed Sept. 26, 1944   2 Sheets-Sheet 1
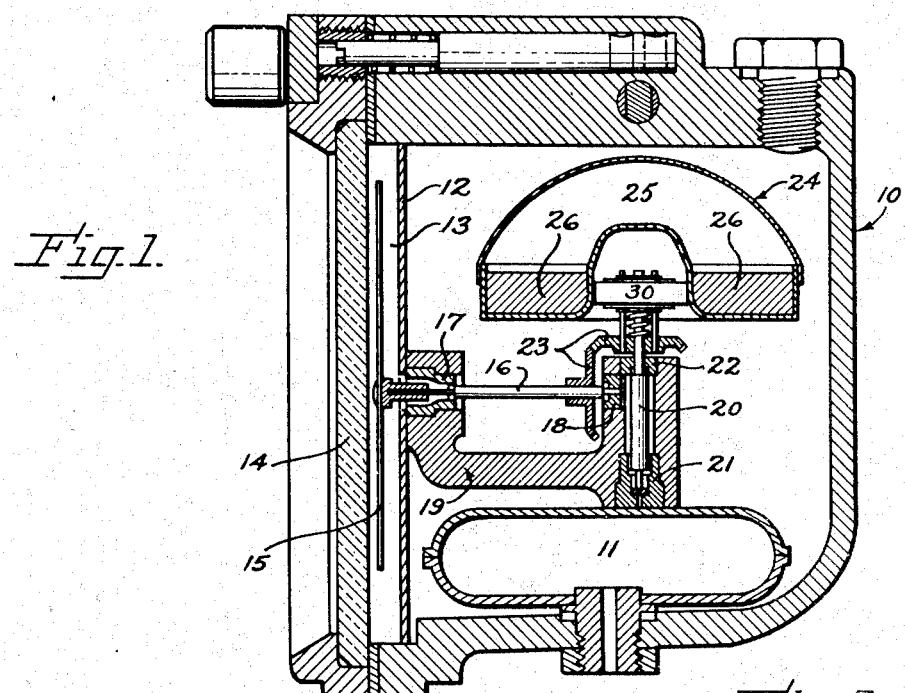
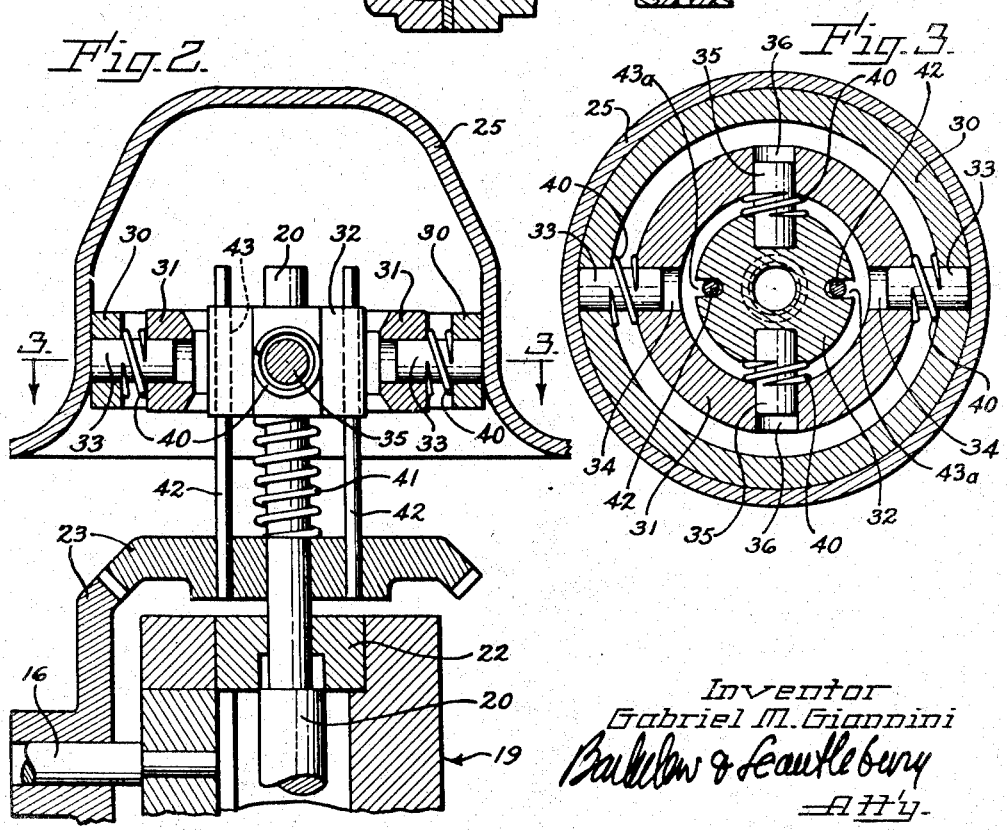
Inventor
Gabriel M. Giannini
Atty.

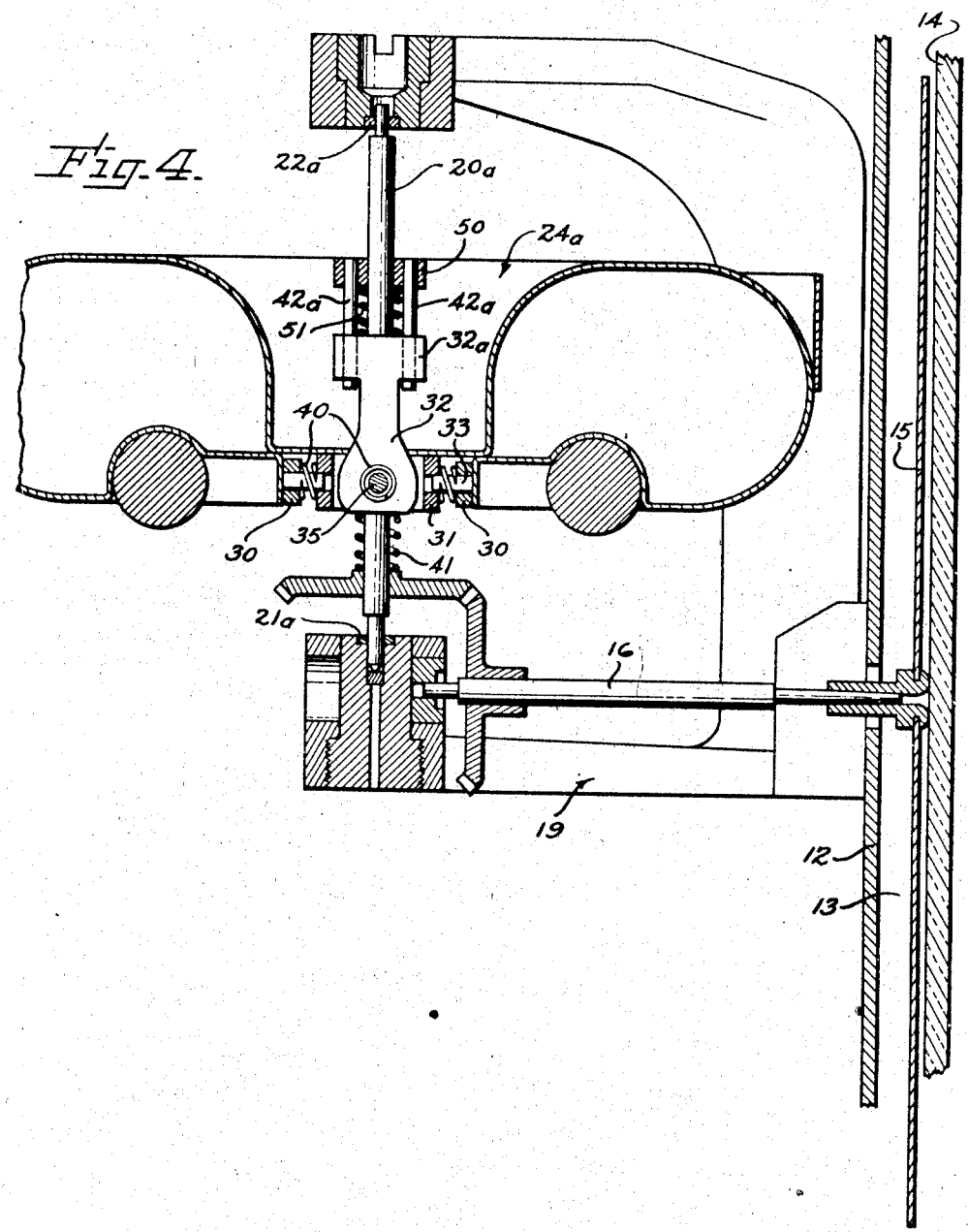

Patented June 24, 1947

2,422,960

UNITED STATES PATENT OFFICE 2,422,960

ELIMINATION OF VIBRATION ERRORS IN MAGNETIC COMPASSES AND THE LIKE

Gabriel M. Giannini, West Los Angeles, Calif., assignor to Autoflight Corporation, Burbank, Calif., a corporation of Delaware Application September 26, 1944, Serial No. 555,829

2 Claims. (Cl. 248—358)

This invention has to do with elimination of errors which are due to vibrations imposed upon instruments such as magnetic compasses or direction indicators. As will be understood from the following discussion of the general principles underlying the invention, the invention is applicable generally to instruments of any type or character which involve a rotatable means which is supposed, under the application of a torque moment, to take some predetermined position. The invention has particular utility as applied to instruments in which the torque moment is comparatively small; and magnetic compasses, direction indicators, dip needles, etc., are typical, but not all, of instruments of that class and type. The following description will be based, but only illustratively, on the application of the invention to magnetic direction indicators and compasses.

In magnetic direction indicators—instruments which involve a normally vertical shaft fixed in the instrument frame on a vertical axis and to which a magnet unit is coupled, and a normally horizontal indicator shaft rotatively coupled to the vertical shaft, attempts have been made to balance out the torques due to imposed vibration, so that the resultant effect of the vibrations on the instrument as a whole would be, if the system were successful, completely or nearly nullified. According to Kollsman Patent No. 2,294,990, dated September 8, 1942, a direction indicator in an airplane is subjected to oscillatory vibrations which commonly occur in a plane making an angle of about 45° with each of the two instrument shafts. The oscillatory vibration is, or may be viewed as being, of a circular nature. The effect of such an oscillatory vibration is to give each of the two shafts a tendency to rotate in a definite direction with relation to the direction of the vibratory movement; and in the Kollsman patent an attempt is made to nullify the vibrationally created torques by intercoupling the two shafts in such a manner that the torques are opposed.

In theory it would be possible to eliminate vibrational errors in such an instrument (one involving two masses rotating on axes at an angle to each other) by balancing out the two torques; but in the actual production of such instruments elimination of the vibration errors in that manner has proved to be impracticable; and of course that method of eliminating the vibration errors is not applicable at all to an instrument which involves a mass or masses rotating about a single axis.

As a result of extended tests I have found that the effective vibration-caused torque tending to rotate a mass about its axis of rotation depends upon several different factors. In addition to being dependent upon the amplitude and frequency of the vibration and its relative orientation, the effective torque also depends upon the angular moment of the rotative body (its mass and distance from center of rotation) and upon the diameter of the bearings in which the rotating body is carried, and upon the clearances in those bearings. According to my investigations, the rotational torque is due to a gyratory or precessional movement of the shaft in its bearings; and, in general, increases with increase in bearing clearance, and decreases with increase in effective bearing diameter. That is, the precessional movement increases with an increase of the ratio of bearing clearance to effective bearing diameter. Using bearings of the relatively small diameters which are required in instruments of the type under consideration, the gyratory or precessional movement of the rotating body is present, and the effective torque is large enough to cause a considerable error in a compass, unless the bearing clearance is reduced to such a small amount that the bearing becomes too tight considering the low value of the torques involved.

Consequently, in order to balance the effective torques of two intercoupled shafts, it is necessary in manufacture of an instrument to control the angular moments of the two rotating bodies, and their bearing diameters and clearances; and I find that the control necessary in the last two named factors is so fine as to be substantially unachievable in any practicable production of instruments. I find also that there are other performance factors which must be taken into account. Any given rotational system has a critical resonant frequency above which the system tends to precess in one direction and below which it tends to precess in the opposite direction, the character and amplitude of the imposed vibration remaining fixed. That critical resonant point varies with the mass of rotative body and also varies with bearing clearances, a smaller clearance being associated with a higher critical frequency. But I find that in practice the bearing clearance cannot be made small enough to put the critical resonant point above the frequency range commonly encountered in aircraft—say above a frequency of 2500 per minute. To carry the critical frequency above that point the clearance has to be so small that the bearing becomes too tight. And the existence of critical resonance frequency is another reason why in order to balance out the two torques, it is necessary to minutely control factors of effective bearing diameters and clearances.

As a result of my investigations and conclusions I have produced a fully effective system for eliminating, either wholly or substantially wholly, all of the error introduced to a rotational system like a compass or direction indicator, and my system is equally well applicable to an ordinary compass or to a direction indicator. In an ordinary compass where a magnet unit (a compass card or a float associated with a magnet) is mounted on a normally vertical shaft (a shaft which rotates about an axis fixed vertically with reference to the instrument frame) through the medium of a gimbal connection, I find that if the rotating mass is mounted upon the shaft in such a manner as to have, relative to the shaft, freedom of movement in all directions or degrees except that of rotation about the axis of the shaft; that then the rotating mass is quite completely insulated from the effects of imposed vibration, and that compass error due to vibration is either completely eliminated or minimized to a negligible amount. And in applying my invention to an instrument of the type of direction indicators (hereinafter described) I find that, although the rotating mass on the indicator shaft may likewise be insulated from the imposed vibrations, it is not necessary to do that. By minimizing the moment of the mass on the indicator shaft, and/or by subjecting that rotating mass to a suitably large and easily achieved drag, the final vibration error in direction indicators of the type and size ordinarily used in aircraft may be reduced to much less than 1°. It is thus not necessary, even in an instrument of the direction indicator type, to attempt to balance or to eliminate the effective vibration torques on the two shafts; it is sufficient if the mass of larger moment—the compass card or float and magnet unit—be effectively insulated from the vibration as I described.

The drawings show typical applications of my invention to typical direction indicators. In the drawings:

Fig. 1 is a vertical central section showing my invention applied to a form of direction indicator in which the magnet unit is mounted on a shaft which has no bearing support above the unit;

Fig. 2 is an enlarged sectional detail of portions of Fig. 1;

Fig. 3 is a horizontal section on line 3—3 of Fig. 2;

Fig. 4 is a fragmentary vertical section showing the application of my invention in modified form of another type of direction indicator.

Referring first to Fig. 1 the direction indicator is shown as housed in a case 10 adapted to be filled with a liquid such as kerosene and equipped with an expansion chamber 11. A wall 12 near the front of the chamber divides the main chamber interior from a needle chamber 13 which also contains the same liquid; the front wall of chamber 13 being formed by the glass 14.

Indicator needle 15 is mounted on the forward end of needle shaft 16 which is normally horizontal and mounted in bearings 17 and 18 which are supported in a frame 19 which is preferably made as a piece independent of case 10. The vertical shaft 20 is also mounted in the same frame 19 in bearings 21 and 22, and the two shafts are rotatively intercoupled by gears 23. The magnet unit is shown at 24, consisting of a float proper 25 and a magnet or magnets 26, carried upon the upper end of shaft 20 in the manner which will be described. The unit will preferably be so mounted that it acts as an inverted pendulum in the liquid; and also preferably designed and mounted so that its centers of suspension, of mass and of buoyancy bear those certain relations to each other that are set out in my copending application, Ser. 499,347, filed August 20, 1943. The particulars of mounting of the unit, with regard to the factors just mentioned, has however no significance as regards the present invention.

Ordinarily, or universally, such a magnet unit is mounted upon vertical shaft 20 through the medium of a gimbal or equivalent joint—that is, a joint which only allows two degrees of rotational freedom with reference to the shaft, about axes at right angles to the shaft axis, and which allows no translational freedoms. In contradistinction, my vibration insulative mounting allows all the degrees of translational and rotative freedom with relation to the shaft except rotative freedom about the axis of the shaft.

Although the necessary freedoms may be obtained by using a joint or connective means other than a gimbal, I prefer to use the gimbal type of joint and to equip it with special means for allowing the necessary translational freedoms. Figs. 2 and 3 show a preferred design. In these figures the outer ring of the gimbal is shown at 30, with float 25 mounted directly and rigidly upon it. The inner or intermediate gimbal ring is shown at 31, and the inner ring or hub of the gimbal is shown at 32. Outer ring 30 is mounted on a pair of pivot pins 33 which are carried by the intermediate ring 31, these pivot pins being in all essential regards the same as ordinary gimbal pivots except that a substantial annular spacing is allowed between rings 30 and 31 and the outer ring 30 may move translationally with reference to ring 31 along the axis of pivot pins 33. That translational freedom may be arranged for in any suitable manner, but is here indicated as being allowed simply by the sliding of pivot pins 33 in bores 34 in ring 31.

Ring 31 is similarly mounted with reference to hub 32 on pivot pins 35 which may slide in the bores 36 in ring 31; so that ring 31 has a translational freedom along the axis of pivot pins 35 at right angles to the axis of pins 33. Ring 31 is also sufficiently annularly spaced from hub 32 to allow the last mentioned relative movement.

To keep the gimbal rings normally centered on the center of hub 32 and therefore on shaft 20, and to restore the system to concentricity after disturbance, I employ light springs 40 which are preferably placed around the several pivot pins between the respective rings. The strength of these springs preferably is such that they exert small restoring forces, and such that the resonant frequency of the system including the springs is comparatively low, say not over 500 per min. In any case that resonant frequency is made to be less than the lower limit of the range of imposed frequencies likely to be encountered. The latter commonly range from 600 to 2500 per minute; and in that case a resonant frequency of 500 or less is suitable. It is also desirable that that resonant frequency be higher than the free rotational frequency of the magnet element, which, for the float and magnet illustrated is about 60 per minute or less.

Hub 32 is mounted on shaft 20 in any suitable manner which will allow relative vertical translation of the hub, and therefore of the gimbal system and the float, without allowing rotational freedom on shaft 20. Any suitable kind of splining may be employed; but with individual parts as small as commonly used in these instruments, I prefer such an arrangement as shown in Figs. 2 and 3. Hub 32 is supported in the desired normal elevational position by a light spring 41 which rests upon one of the gears 23. The strength of that spring bears such a relation to the supporting mass that a resonant frequency of the spring supported system is also of the order mentioned above (say, less than 500 per min.). Hub 32 is rotationally confined with reference to shaft 20 by a pin or pins 42 which are rigidly mounted at their lower ends in gear 23 and extend through bores 43 or notches 43a in hub 32, in sliding fit.

By such a system of mounting, the gimbal supporting float unit is given all degrees of freedom except that of relative rotation with reference to the vertical shaft. With the float unit given those freedoms I find that, in a compass which does not include a pointer shaft such as shown at 16, the vibration error is either completely eliminated or reduced to a negligible amount. The light restoring springs merely act to keep the float unit normally concentric with the shaft; and the spacings between the several elements of the gimbal, and the allowable vertical movement of hub 32 on shaft 20, are made large enough to accommodate the maximum amplitudes of vibration likely to be encountered, without the several parts of the gimbal coming into contact with each other. The purpose of the light restoring springs is to keep the several parts in normal relative positions and to keep the several elements of the gimbal out of inter-contact.

The following observations may be made with regard to the system of suspension as so far described, applied to a compass which has no pointer or pointer shaft 16 and in which no torque is transmitted from shaft 20 so that that shaft becomes in full effect only a fixed mounting shaft for the magnet element. With reference to the frame of the instrument, the magnet element has all six degrees of freedom; and of those six, only the three translational degrees have the spring restoring forces associated with them. With reference to the fixed-axis vertical mounting shaft the magnet element has three degrees of translational freedom along three axes at right angles to each other. With reference to the fixed axis of that shaft the magnet element also has three degrees of rotational freedom about three axes (one of them the shaft axis) at right angles to each other. In an instrument which does not involve an indicator driven by the vertical shaft, the magnet element may or may not be rotatable with reference to the shaft itself; but in an instrument of the direction indicator type the mounting shaft must revolve with the magnet element and therefore that element has only five degrees of freedom relative to the shaft, but six relative to its axis.

As applied to a direction indicator of such design as shown in Fig. 1, the mass which is mounted upon pointer shaft 16 may also, as I have said, be similarly mounted to allow five degrees of freedom relative to its shaft; but I find that unnecessary. By using a pointer 15 of an ordinarily small mass, and further by making pointer chamber 13 relatively narrow so that the pointer is closely confined between the two walls 12 and 14 and a relatively large damping effect is set up in the liquid, I find that the final resultant vibration error of such a direction indicator may easily be reduced to much less than one degree.

Fig. 4 shows in enlarged fragmentary vertical section the application of a somewhat modified form of my invention to a different design of direction indicator. Here, the normally vertical shaft 20a is supported in bearings 22a and 21a at its upper and lower ends; and the float and magnet unit 24a is mounted on shaft 20a intermediate its ends. The gimbal structure, with its freedoms and restoring springs, may be the same as is shown in Figs. 2 and 3, and the elements of that structure are designated by the same numerals in Fig. 4. Hub 32 is supported by spring 41 as before explained. In this form the hub 32 has an upper extension 32a which slidingly takes a pair of pins 42a which are mounted in and depend from a collar 50 which is rigidly mounted on shaft 20a. And a light spring 51, confined between collar 50 and hub extension 32a, lightly resists relative upward movement of the gimbal and the float unit, so that hub extension 32a cannot come into actual contact with collar 50. Springs 41 and 51, with reference to the supported mass, set up a system having the same low resonant frequency as before stated.

I claim:

1. In instruments of the type of a magnetic compass and which embody a frame, a normally vertical shaft mounted in bearings fixed in the frame to rotate about a normally vertical axis, and a magnet unit surrounding the shaft axis; mounting means for the magnet unit on the shaft, said mounting means including a gimbal joint of three normally concentric and annularly spaced elements, means mounting the inner one of said elements on the shaft for rotation therewith and vertical freedom with reference thereto, resilient means constraining said vertical freedom, pivotal connections joining the intermediate element to the inner and outer elements, respectively, on axes mutually at right angles, said pivotal connections allowing translational movements of the respectively connected elements along the pivotal axes, and resilient means associated with the said elements and pivotal connections constraining their relative translational movements.

2. In instruments of the type of a magnetic compass and which embody a frame, a shaft mounted in the frame on a normally vertical axis fixed with reference to the frame, and a magnet unit surrounding the shaft axis; means for mounting the magnet unit on the shaft, said mounting means including a member mounted on the shaft for rotation about the shaft axis and for translation lengthwise of that axis, resilient means constraining said translation of said member, connective means between said member and the magnet unit, said means allowing rotational movement of the magnet element with reference to said member about two horizontal axes at right angles to each other and allowing horizontal translational movement of the magnet element with reference to said member along two horizontal axes at right angles to each other, and resilient means constraining the said horizontal translational movements of the magnet unit.

GABRIEL M. GIANNINI.

REFERENCES CITED

The following references are of record in the file of this patent:

UNITED STATES PATENTS

| Number | Name | Date |
|---|---|---|
| 163,839 | Baker | June 1, 1875 |
| 2,294,990 | Kollsman | Sept. 8, 1942 |

FOREIGN PATENTS

| Number | Country | Date |
|---|---|---|
| 10,511 | Great Britain | May 6, 1907 |
| 139,920 | Great Britain | Mar. 18, 1920 |